United States Patent
Kassai et al.

(10) Patent No.: US 6,979,018 B2
(45) Date of Patent: Dec. 27, 2005

(54) CHILDCARE INSTRUMENT WITH ADJUSTABLE VENTILATION

(75) Inventors: Kenzou Kassai, Osaka (JP); Kaichi Fujimoto, Osaka (JP); Miyuki Nishikura, Osaka (JP)

(73) Assignee: Aprica Kassai Kabushikikaisha, Osaka (JP)

(*) Notice: Subject to any disclaimer, the term of this patent is extended or adjusted under 35 U.S.C. 154(b) by 36 days.

(21) Appl. No.: 10/305,925

(22) Filed: Nov. 26, 2002

(65) Prior Publication Data

US 2004/0100050 A1 May 27, 2004

(51) Int. Cl.[7] .................................................. B62B 7/00
(52) U.S. Cl. .................. 280/648; 280/658; 280/47.38; 280/47.4
(58) Field of Search ............................... 280/647, 650, 280/657, 658, 47.38, 648, 47.4; 224/158, 224/159, 160, 161

(56) References Cited

U.S. PATENT DOCUMENTS

| | | | | |
|---|---|---|---|---|
| 5,823,414 A | * | 10/1998 | Gal et al. ................... | 224/637 |
| 6,027,137 A | * | 2/2000 | Rura .......................... | 280/650 |
| 6,032,975 A | * | 3/2000 | Hanson et al. ............. | 280/647 |
| 6,086,086 A | * | 7/2000 | Hanson et al. ............. | 280/650 |
| 6,098,857 A | * | 8/2000 | Le Gal ....................... | 224/161 |
| 6,106,057 A | | 8/2000 | Lee | |
| 6,270,111 B1 | * | 8/2001 | Hanson et al. ............. | 280/650 |
| 6,283,347 B1 | | 9/2001 | Roh | |
| 6,322,097 B1 | * | 11/2001 | Lan ............................ | 280/642 |
| 6,471,222 B1 | * | 10/2002 | Hsia .......................... | 280/47.4 |
| 6,715,783 B1 | * | 4/2004 | Hanson et al. ............. | 280/642 |
| 6,736,299 B2 | * | 5/2004 | Bergkvist .................. | 224/160 |

FOREIGN PATENT DOCUMENTS

| | | |
|---|---|---|
| JP | 52-78241 | 6/1977 |
| JP | 2000326778 | 11/2000 |
| JP | 2001097226 | 4/2001 |
| JP | 2002187554 | 7/2002 |
| JP | 2002220050 | 8/2002 |
| KR | 1988-7887 | 6/1988 |

* cited by examiner

*Primary Examiner*—Bryan Fischmann
*Assistant Examiner*—Bridget Avery
(74) *Attorney, Agent, or Firm*—W. F. Fasse; W. G. Fasse (57) ABSTRACT

A childcare instrument or baby carriage has a core member contained removably in a bag placed on the rear side of the carriage, and the core member includes a first plate member and a second plate member arranged to overlap each other. The first plate member has first apertures piercing therethrough in the direction of thickness. The second plate member has second apertures piercing therethrough in the direction of thickness, and the second plate member is relatively displaceable between a first position to align the first apertures with the second apertures and a second position to displace the first apertures from the second apertures. The childcare instrument thus provided is accordingly capable of adjusting the degree of breathing.

7 Claims, 9 Drawing Sheets

CHILDCARE INSTRUMENT WITH ADJUSTABLE VENTILATION

BACKGROUND OF THE INVENTION

1. Field of the Invention

The present invention relates to such childcare instruments as stroller, child seat, cot, and baby carrier for example.

2. Description of the Background Art

Childcare instruments are desirably developed to provide a comfortable environment to an infant or child resting or sitting on a seat for example. Moreover, it is desirable not to cause anxiety to a mother for example who operates such a childcare instrument as baby carriage.

Breathing is one factor of the comfortable environment for children. In summer or on a hot and humid day, a seat with good breathing is preferable for giving a cool environment to a child sitting on a seat. On the other hand, in winter or on a cold and windy day, a seat preferably keeps out drafts to keep thermal insulation by preventing dissipation of heat.

A baby carrier which is one of the childcare instruments is composed of a parent equipment worn by a parent and a child carrier, and both preferably have breathing in order to provide the coolness in summer or on a hot and humid day while keeping thermal insulation in winter or on a cold and windy day.

As for a hooded baby carriage, a mother operating the carriage by pushing the back thereof may not see the child on the seat and accordingly feel anxiety.

SUMMARY OF THE INVENTION

One object of the present invention is to provide a childcare instrument with the degree of breathing adjustable.

Another object of the present invention is to provide a childcare instrument with a seat that is equipped with a hood which ensures that a child on the seat is visually recognizable as required.

According to one aspect of the present invention, a childcare instrument with a seat including a wall forming a child-receiving space has the following characteristics. The wall includes first and second plate members arranged to overlap each other. The first plate member has a first aperture piercing through the first plate member in the direction of thickness. The second plate member has a second aperture piercing through the second plate member in the direction of thickness, and the second plate member is relatively displaceable between a first position to align the first and second apertures with each other and a second position to displace the first and second apertures from each other.

According to one aspect of the present invention having the above-described structure, the second plate member is held at the first position to pass wind or a current of air through the aligned first and second apertures, and thus good breathing is achieved. On the other hand, the second plate member is held at the second position to close the first and second apertures and accordingly prevent wind or current of air from passing through the apertures, and thus good thermal insulation is achieved.

According to one preferred embodiment of the present invention, the first and second plate members are placed along seat base, back or lateral sides of the seat. Any one of the seat base, back and lateral sides of the seat may have the first and second plate members placed thereon, or the first and second plate members are provided along all of the seat base, back and lateral sides of the seat.

The childcare instrument may include a core member placed along the seat base or back of the seat. In this case, the core member may include the first and second plate members. Such a childcare instrument may include a sheet placed along the seat base and the back of the seat as well as a bag attached behind the sheet located along the back. In this case, the core member may be contained in the bag to be removable therefrom.

According to another preferred embodiment, the childcare instrument includes a hood above the seat. In this case, a wall constituting the hood includes the first and second plate members. With this structure, it is possible to see or visually recognize a child in the seat through the first and second apertures aligned with each other by holding the second plate member at the first position. Thus, anxiety of a mother for example operating the childcare equipment is removed.

According to another aspect of the present invention, a childcare instrument with a seat includes a wall forming a child-receiving space, and this wall has an air vent and an open/close mechanism for opening/closing the air vent. The open/close mechanism may be moved to open the air vent and accordingly pass wind or current of air into the seat. On the other hand, the open/close mechanism may be moved to prevent wind or current of air from entering.

According to still another aspect of the present invention, a childcare instrument serving as a baby carrier includes a parent equipment and a child carrier coupled to the parent equipment for carrying a child. The child carrier includes a child back support member supporting the back of the child, and the child buck support member has an air vent and a first open/close mechanism for opening/closing the air vent. The first open/close mechanism may be moved to open the air vent and accordingly pass wind to the back of a child. The first open/close mechanism may be moved to close the air vent and prevent wind or current of air from entering.

According to another preferred embodiment, the parent equipment includes a parent back support member supporting the back of a parent, and the parent buck support member has an air vent and a second open/close mechanism for opening/closing the air vent. As done for the child back support member, the second open/close mechanism may be moved to open the air vent and pass wind to the back of the parent. The second open/close member may be moved to close the air vent and thus prevent wind from entering.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
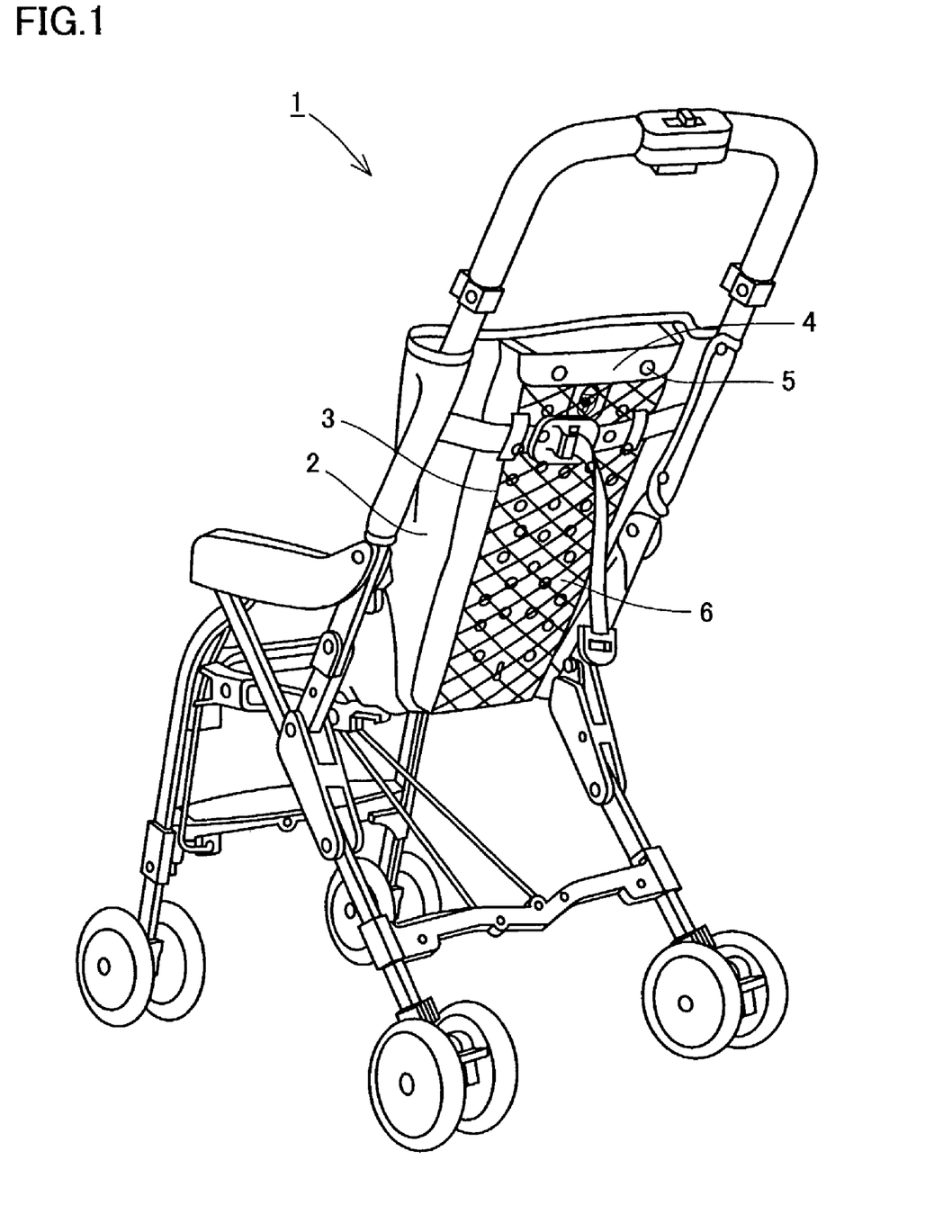
FIG. 1 is a perspective view of a baby carriage according to a first embodiment of the present invention.

FIG. 1 shows a baby carriage as one example of childcare instruments having respective seats. Baby carriage 1 as shown includes a sheet 2 extending along a base and a backrest of the seat and a mesh bag 3 attached to the rear side of sheet 2 on the backrest. Bag 3 has a top opening provided with a flap 4 which closes the opening with buttons 5. A removable core member 6 is contained within bag 3 for providing rigidity to the rear side of sheet 2.

Figure 2:
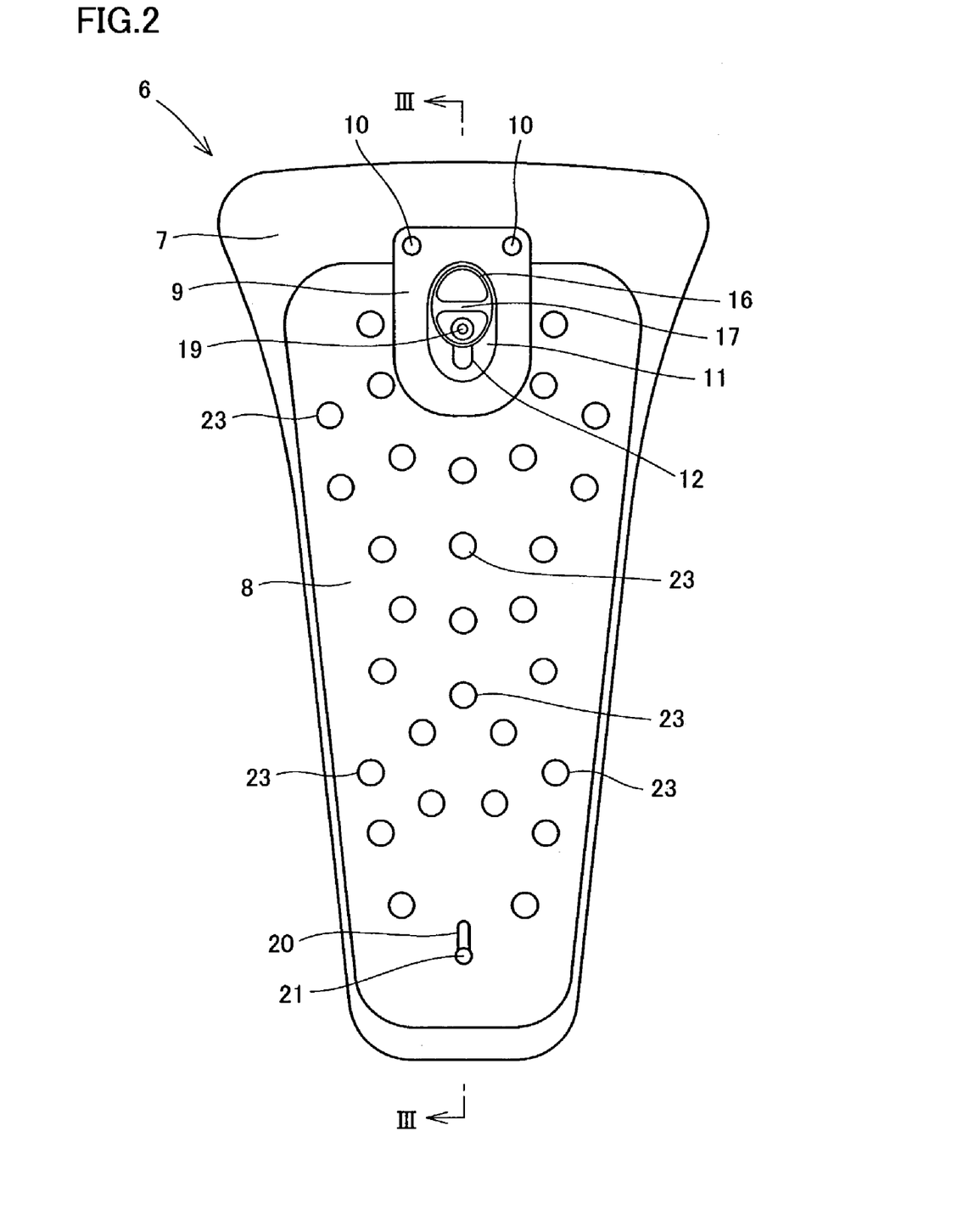
FIG. 2 is a front view of first and second plate members overlapping each other.
Figure 3:
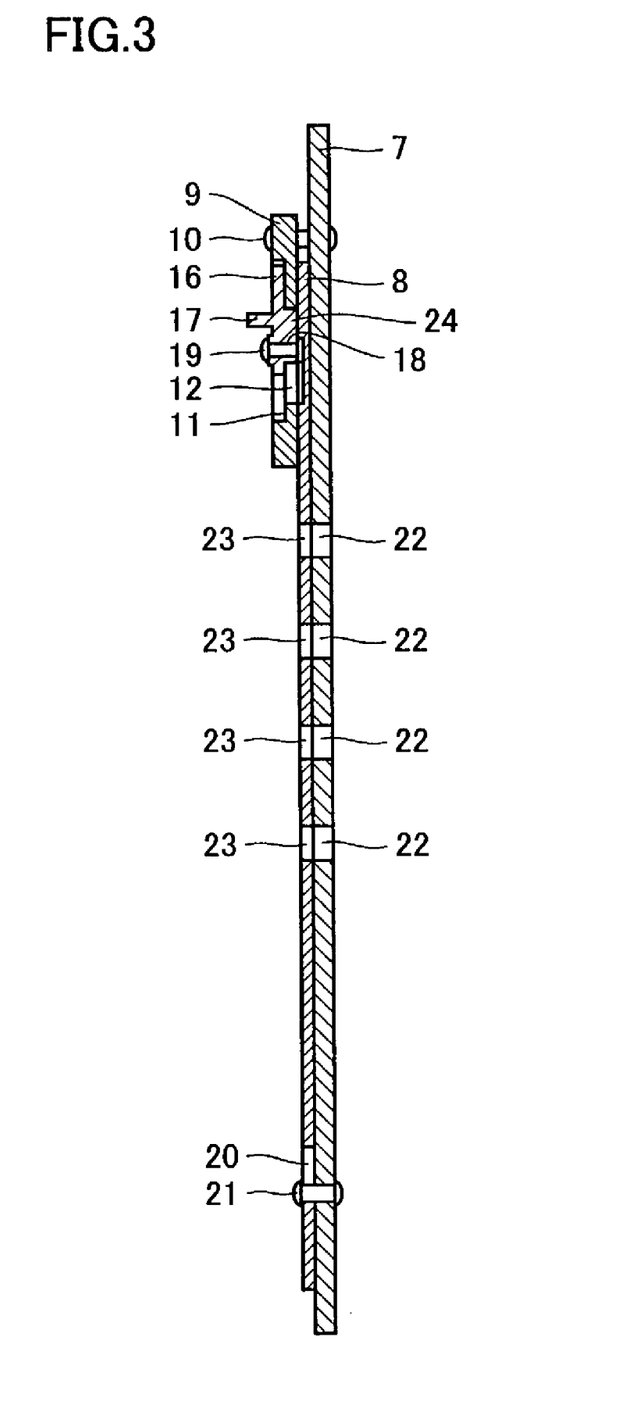
FIG. 3 is a cross sectional view along line III—III in FIG. 2.

FIGS. 2 and 3 show core member 6 in detail. Core member 6 as shown includes a first plate member 7 and a second plate member 8 arranged to overlap each other. The second plate member 8 placed on the back of the first plate member 7 is smaller than the first plate member 7 with respect to the thickness and area in the direction in which the plates extend.

To the upper portion of the first plate member 7, a top plate 9 is fastened with steady pins 10. Between top plate 9 and the first plate member 7, there is a gap with its thickness corresponding to the thickness of the second plate member 8 as shown in FIG. 3. The top end part of the second plate member 8 is sandwiched between the top plate 9 and the first plate member 7, and is placed to be displaceable up-and-down.

Figure 4:
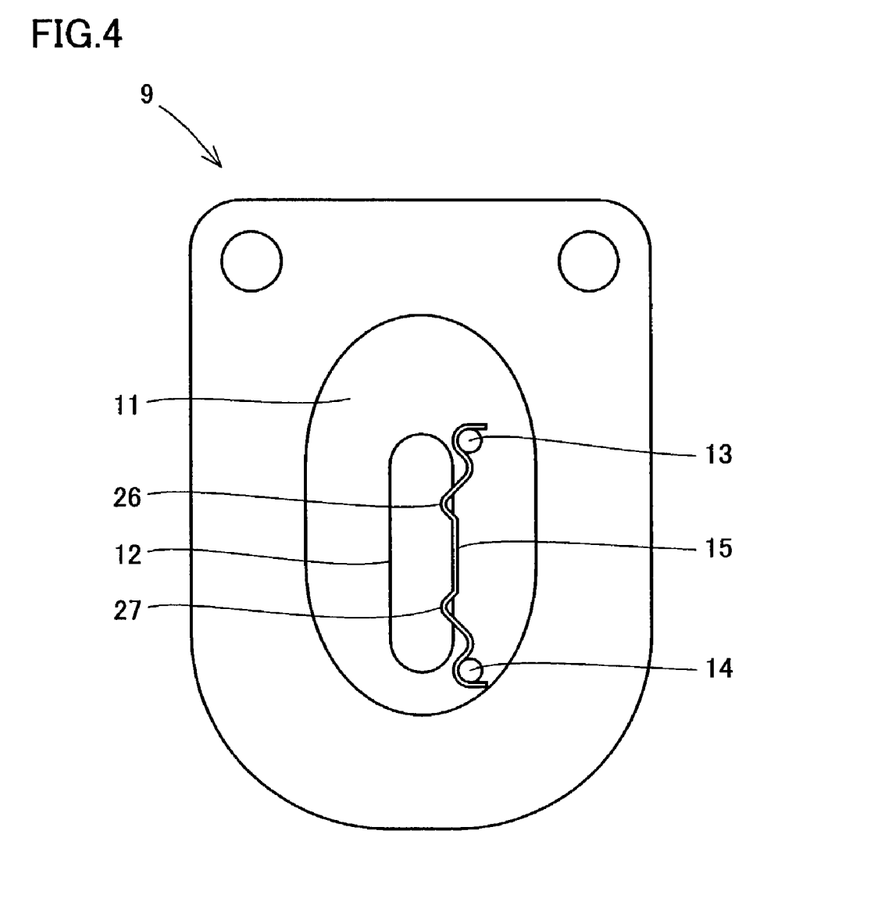
FIG. 4 is a front view of a top plate.

Referring to FIG. 4, top plate 9 is described in detail. Top plate 9 has its central region where a recess 11 with a decreased thickness as well as a guide through-hole 12 which is cut through top plate 9 in the direction of the thickness and extending long in the longitudinal direction are provided. Further, a leaf spring 15 extending long in the longitudinal direction along guide through-hole 12 is held between two pins 13 and 14 separated from each other. Leaf spring 15 has two protruding catches 26 and 27 projecting toward guide through-hole 12.

Figure 5:
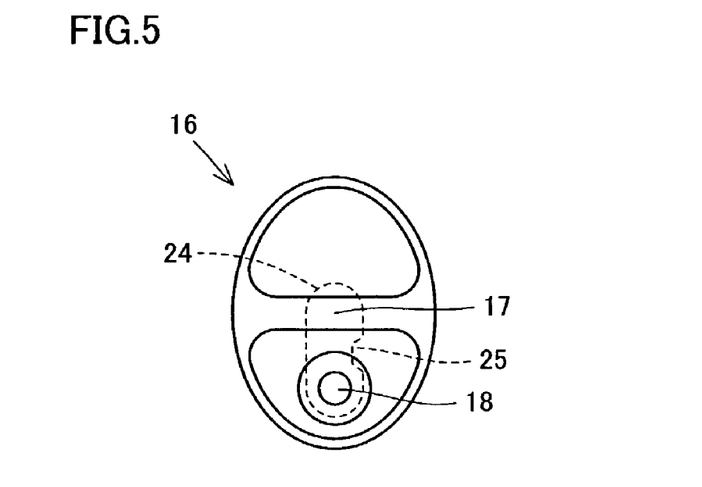
FIG. 5 is a front view of a control knob.

As shown in FIGS. 2 and 3, a control knob 16 is fastened to the second plate member 8 through a coupling pin 19. As shown in detail in FIG. 5, control knob 16 has a center protrusion 17 to be pinched between fingers. A hole 18 is provided below center protrusion 17 for passing coupling pin 19 therethrough. On the base of control knob 16, a fitting projection 24 extending somewhat long in the longitudinal direction is provided.

Control knob 16 is placed within recess 11 of top plate 9 and fitting projection 24 of control knob 16 is placed in guide through-hole 12 of top plate 9. Fitting projection 24 of control knob 16 has a receiving catch 25 engaging with protruding catch 26 or 27. Control knob 16 is displaceable up and down within recess 11 of top plate 9. Control knob 16 in the state as shown in FIGS. 2 and 3 is located at the uppermost position within recess 11, and fitting projection 24 of control knob 16 is also located at the uppermost position within guide through-hole 12 of top late 9.

As for the lower portions respectively of the first and second plate members 7 and 8, a guide through-hole 20 extending long in the longitudinal direction is formed in the second plate member 8, and an upright pin 21 passing through guide through-hole 20 is provided to the first plate member 7. Upright pin 21 in the state as shown in FIGS. 2 and 3 is located in the lowermost position within guide through-hole 20.

The first and second plate members 7 and 8 have a large number of through holes or apertures 22 and 23 passing through respective plates in the direction of the thickness. In the state as shown in FIGS. 2 and 3, the first and second plate members 7 and 8 have a positional relation with apertures 22 of the first plate member 7 being aligned with corresponding apertures 23 of the second plate member 8. This positional relation is hereinafter referred to as first position for the sake of expediency. In this state, protruding catch 26 which is the upper one of the two protruding catches 26 and 27 of leaf spring 15 engages with receiving catch 25 of fitting projection 24 of control knob 16 and thus relative displacement of the first and second plate members 7 and 8 with respect to each other is prevented.

Control knob 16 in the state shown in FIGS. 2 and 3 is moved downward with center protrusion 17 of control knob 16 pinched between fingers so as to slide the second plate member 8 downward on the first plate member 7. In this state, the first and second plate members 7 and 8 have a positional relation with apertures 22 of the first plate member 7 being displaced from corresponding apertures 23 of the second plate member 8 and accordingly apertures 22 and 23 are closed. This positional relation is hereinafter referred to as second position for the sake of expediency. In the state as shown in FIG. 6, protruding catch 27 which is the lower one of the two protruding catches 26 and 27 of leaf spring 15 engages with receiving catch 25 of fitting projection 24 of control knob 16 and thus relative displacement of the first and second plate members 7 and 8 with respect to each other is prevented.

In summer or on a hot and humid day, the second plate member 8 is held at the first position as shown in FIGS. 2 and 3. In this state, apertures 22 of the first plate member 7 are aligned with corresponding apertures 23 of the second plate member 8 to allow wind or current of air to pass through apertures 22 and 23 of core member 6 on the back into the seat and thus provide the coolness to the back of a child in the seat.

Figure 6:
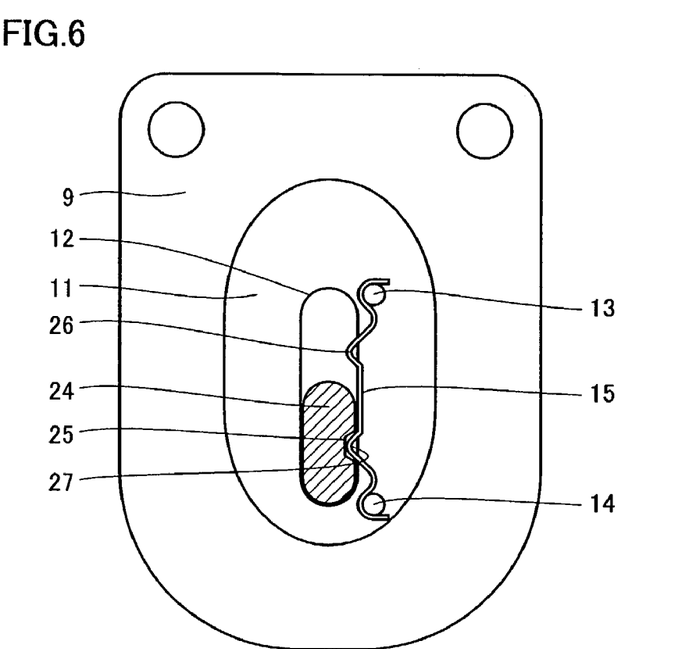
FIG. 6 shows that a fitting projection of the control knob is received in a guide through hole of the top plate.

In winter or on a cold and windy day, the second plate member 8 is moved downward to be held at the second position as shown in FIG. 6. In this state, apertures 22 of the first plate member 7 are displaced from corresponding apertures 23 of the second plate member 8 and accordingly apertures 22 and 23 are closed. Accordingly, no wind or current of air passes through the apertures to keep good thermal insulation or to prevent dissipation of heat.

Figure 7:
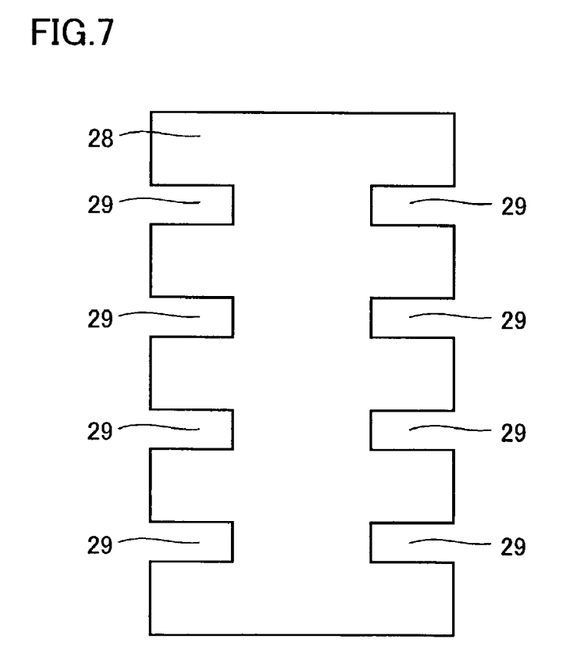
FIG. 7 is a front view of another exemplary plate member.

According to the embodiment illustrated in FIGS. 1–6, all of the apertures 22 and 23 of the first and second plate members 7 and 8 are through holes. This embodiment may be modified by, for example, forming notches 29 extending toward the center from either side of a plate member 28 as shown in FIG. 7.

The preferred embodiment of the present invention has been described in conjunction with FIGS. 1–7 for the purpose of illustration only. Various modifications and variations thereof are possible within the same and equivalent scope of the present invention, some of which being described below.

(1) According to the embodiment shown in the drawings, the first and second plate members are placed along the back of the seat. Alternatively, the first and second plate members may be provided along the seat base of the seat on which a child sits or rests or along the lateral sides of the seat.

Breathing is further improved by providing the first and second plate members on all of the front side, rear side and lateral sides of the seat.

(2) According to the embodiment shown in the drawings, the core member has the first and second plate members. Alternatively, the wall of the body of the childcare instrument, namely the seat itself may have the first and second plate members.

(3) The childcare instrument having a seat to which the present invention is applicable is not limited to baby carriages but is applicable for example to child seats and cradles/cots as well.

(4) According to the embodiment shown in the drawings, the first plate member is stationary or placed immovably while the second plate member is displaceable or placed movably. On the contrary, the first plate member may be displaceable while the second plate member is stationary, or both of the first and second plate members may be displaceable. Moreover, the first and second plate members may be displaceable in the lateral direction, instead of being displaceable longitudinally with respect to each other.

(5) According to the embodiment shown in the drawings, apertures are aligned with corresponding apertures respectively when the first and second plate members have the positional relation corresponding to the first position, and the apertures are displaced with respect to each other and accordingly closed when the first and second plate members have the positional relation corresponding to the second position. The embodiment may be modified to define an intermediate position between the first and second positions that allows the apertures to be half aligned with each other to open partially open the apertures.

(6) According to the embodiment shown in the drawings, the leaf spring is employed for preventing the first and second plate members at the first or second position to be displaced from each other. Alternatively, any means may be taken instead of the leaf spring.

(7) If the childcare instrument is hooded, the hood is a component of a wall which forms a child-receiving space. If a hooded carriage is operated with its back being pushed, the hood obstructs the operating person's view to hinder the person from seeing a child sitting or resting on the seat. Then, first and second plate members as described above may be provided to the wall constituting the hood to allow the child in the seat to be seen through the apertures of the first and second plates members aligned with each other, in order to provide ease of mind to or remove anxiety from a mother for example operating the carriage.

(8) The wall forming the child-receiving space may not have first and second plate members as described in connection with the embodiment. In this case, the wall includes an air vent and open/close mechanism for opening/closing the air vent. The open/close mechanism is moved to open the air vent to allow wind or current of air to blow into and through the seat. The open/close mechanism may be moved to close the air vent and accordingly block out the wind. The open/close mechanism may be a lid member closing the air vent, a plate member rotatably coupled to the wall, or a flexible sheet member attached to the wall, for example.

Figure 8:
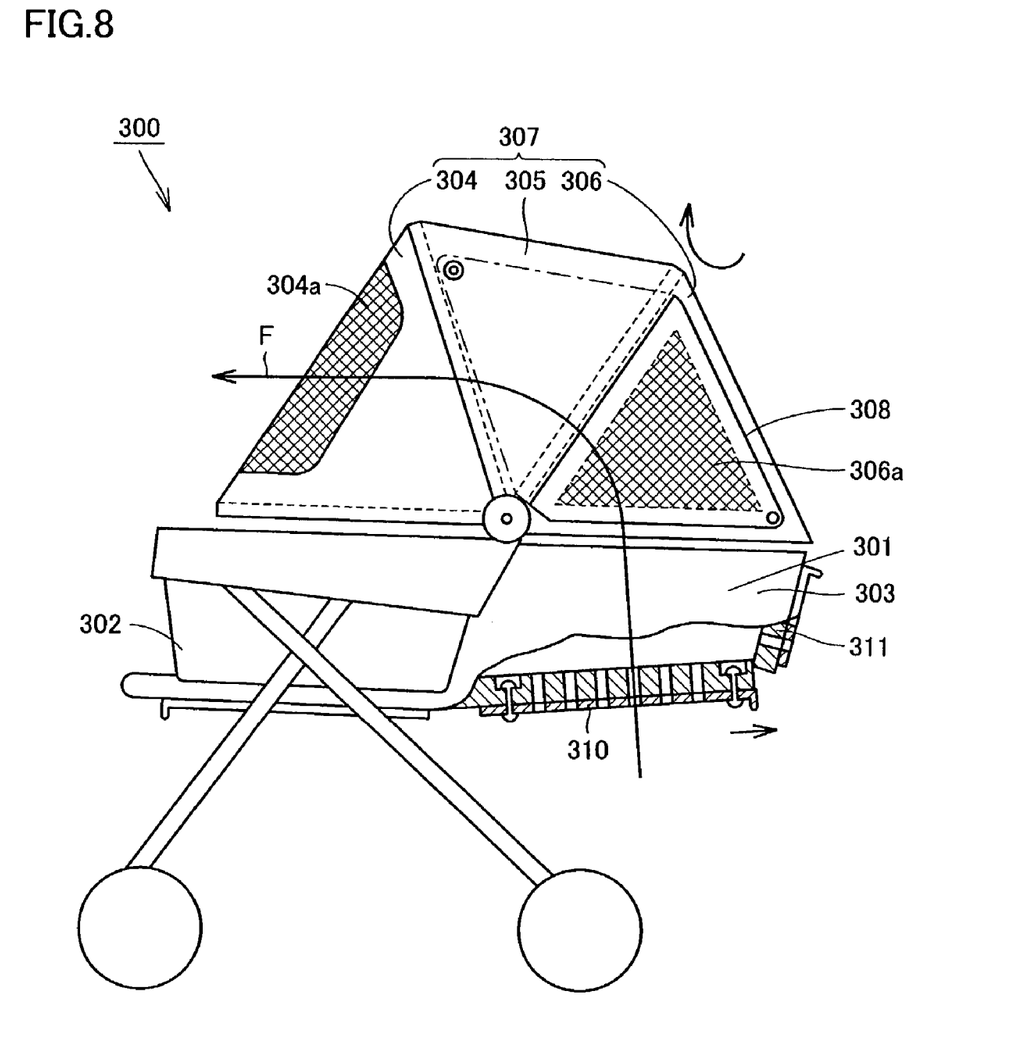
FIG. 8 is a side view of another baby carriage according to the first embodiment of the present invention.

FIG. 8 shows a hooded baby carriage 300. Baby carriage 300 has the same basic structure as that of baby carriage 1 shown in FIG. 1 and includes a seat base unit 302 and a backrest unit 303 which is reclinable or inclinable backward with respect to seat base unit 302, and seat base unit 302 and backrest unit 303 form a child-receiving space serving as a bed as shown. A hood 307 is provided on seat base unit 302 and backrest unit 303 to cover the child-receiving space.

Backrest unit 303 has a head guard 301 for protecting the parietal region or the top of the head of a child. Head guard 301 and backrest unit 303 have respective breathing mechanisms 310 and 311 similar to those described in connection with FIGS. 2–5.

In addition, hood 307 includes a front hood 304, an intermediate hood 305 and a back hood 306 that are coupled in collapsible manner. Front hood 304 has a breathing window 304a which makes the face of a baby visually recognizable. Further, back hood 306 also has a breathing window 306a formed for example of a mesh member as well as an open/close cover 308 for opening/closing breathing window 306a.

Hood 307 as described above has breathing regions to secure a breathing path indicated by arrow F shown in FIG. 8 even when baby carriage 300 is entirely covered with hood, and accordingly good breathing is achieved in the child-receiving space.

Second Embodiment

Figure 9:
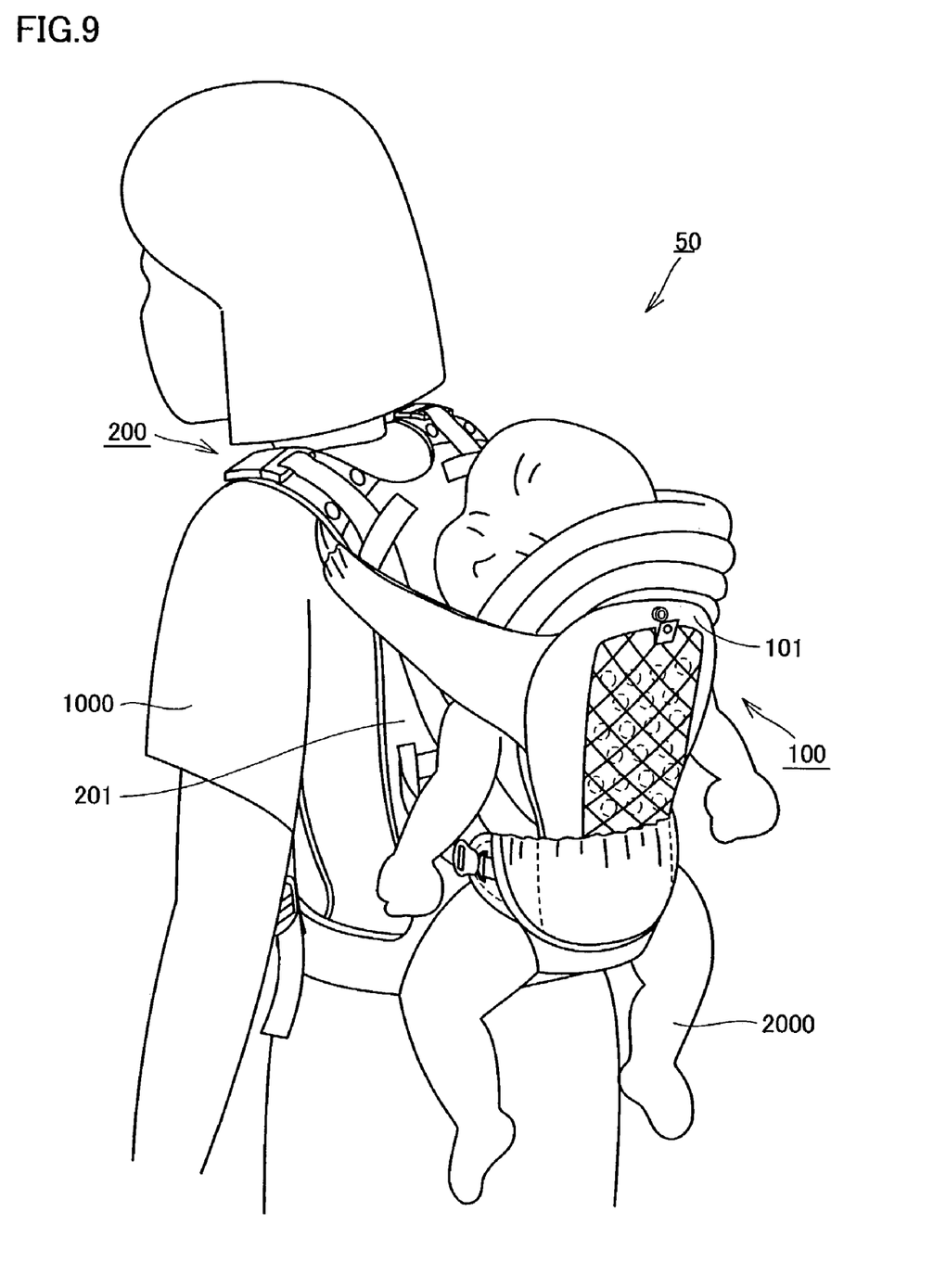
FIG. 9 is a perspective view of a baby carrier according to a second embodiment of the present invention.

FIG. 9 shows a baby carrier as one exemplary childcare instrument. Baby carrier 50 as shown includes a parent equipment 200 warn by a parent 1000 and a child carrier 100 coupled to parent equipment 200 for carrying a child or baby 2000.

Figure 10:
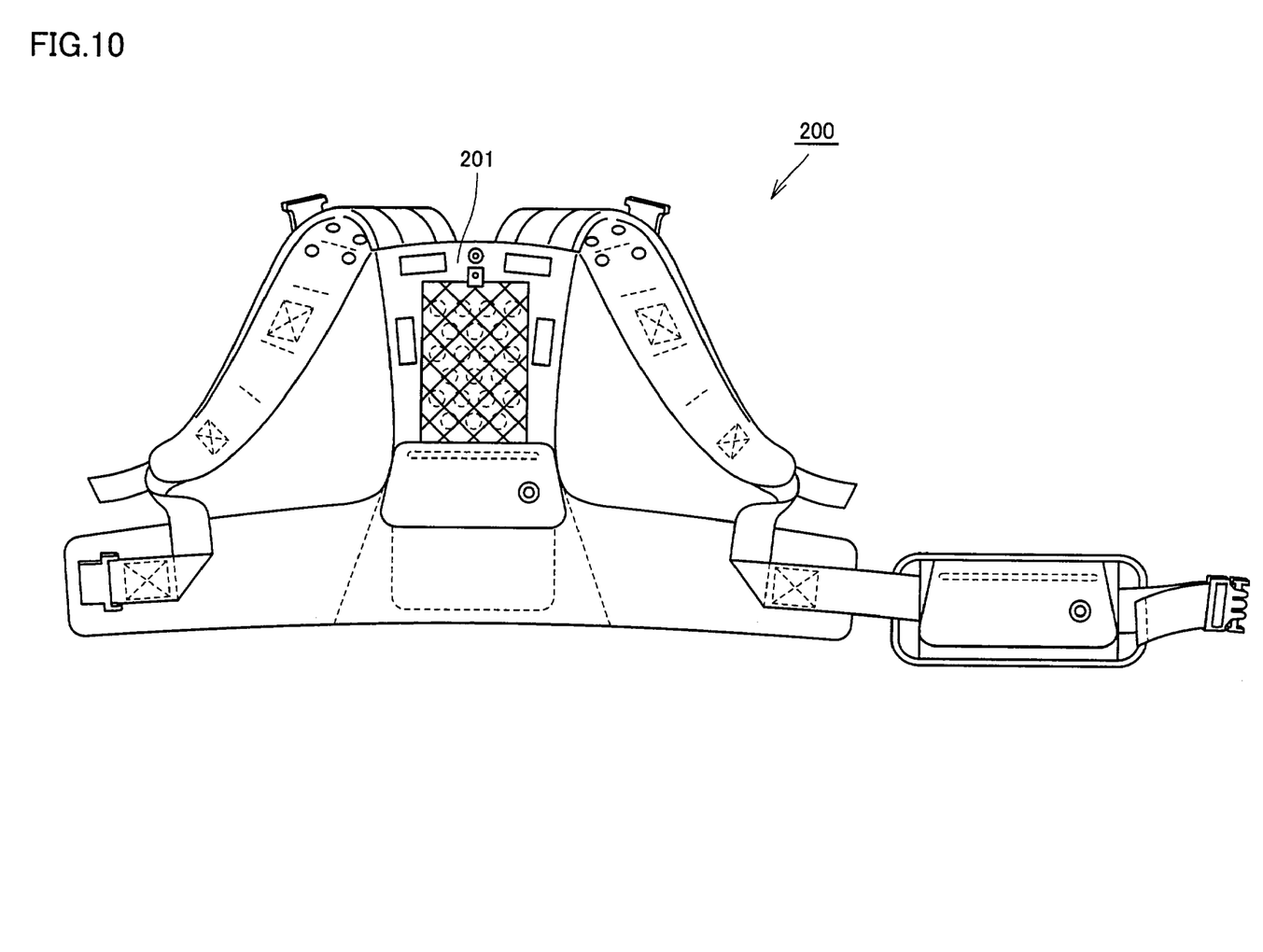
FIG. 10 is a plan view of a parent equipment showing a structure thereof.

Child carrier 100 as shown includes a child back support member 101 for supporting the back of child 2000. Similarly, as shown in FIGS. 9 and 10, a parent back support member 201 is provided for supporting the back of parent 1000.

Figure 11:
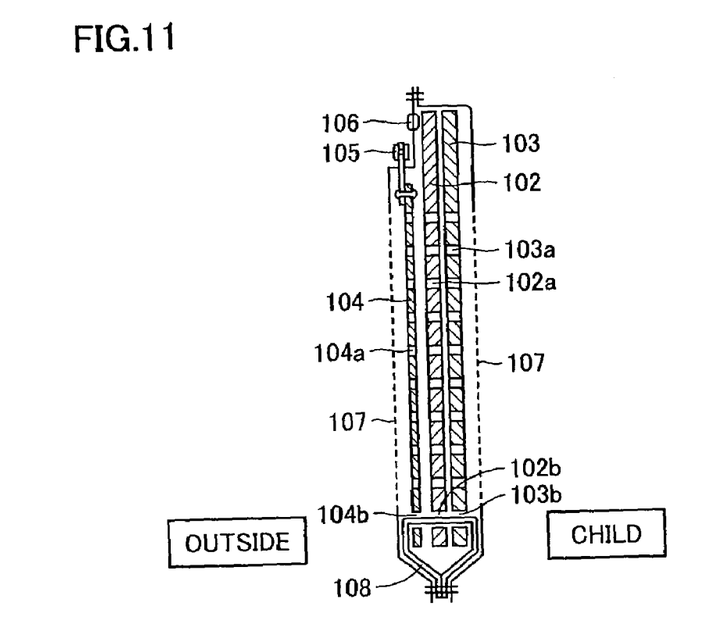
FIG. 11 is a cross sectional view of a back support member 101 of a child showing a structure thereof.

Child back support member 101 includes air vents and first open/close mechanism for opening/closing the air vents as shown in detail in FIG. 11.

Child back support member 101 has a first plate member 102 and a second plate member 104 placed to overlap each other. The first plate member 102 has a plurality of first apertures 102a piercing therethrough in the direction of the thickness. The second plate member 104 also has a plurality of second apertures 104a piercing therethrough in the direction of the thickness.

The first apertures 102a and the second apertures 104a are provided to be displaceable with respect to each other between a first position and a second position. At the first position, all apertures are matched in position and aligned with corresponding apertures as shown in FIG. 11. At the second position, all apertures are displaced from corresponding apertures by sliding the second plate member 104.

The first plate member 102 has one side facing the child that is provided with a cushion member 103. Cushion member 103 has third apertures 103a corresponding to the first apertures 102a of the first plate member 102. The second plate member 104 is provided on the other side (outside) of the first plate member 102 that is opposite to that one side on which cushion member 103 is provided.

On respective bottom ends of the first plate member 102, the second plate member 104 and cushion member 103, opening regions 102b, 104b and 103b are provided. Opening regions 102b, 104b and 103b are used for placing such an elastic member 108 as rubber coupling the first plate member 102, the second plate member 104 and cushion member 103 to each other. Accordingly, the second plate member 104 is sidable with respect to the first plate member 102. In the normal state, all of the apertures are matched in position and aligned, i.e., at the first position.

The first plate member 102, the second plate member 104 and cushion member 103 are covered with a breathing covering member 107 like a mesh for example. On the top end of the second plate member 104, a catch 105 like a hook for example is provided. Above catch 105, covering member 107 has a catch 106 like a hook for example for detachably holding catch 105. The second plate member 104 is slid upward to allow catch 105 to be caught by catch 106 so as to select the second position at which all apertures are displaced from corresponding apertures.

Figure 12:
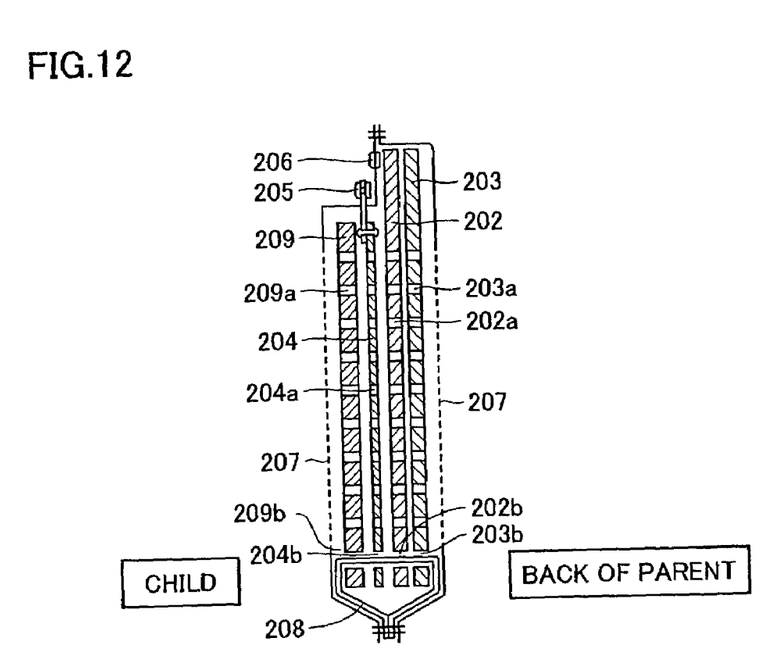
FIG. 12 is a cross sectional view of a back support member 201 of a parent showing a structure thereof.

Parent back support member 201 also includes air vents and second open/close mechanism for opening/closing the air vents similar to those of child back support member 101 as shown in detail in FIG. 12.

Parent back support member 201 has a first plate member 202 and a second plate member 204 placed to overlap each other. The first plate member 202 has a plurality of first apertures 202a piercing therethrough in the direction of the thickness. The second plate member 204 also has a plurality of second apertures 204a piercing therethrough in the direction of the thickness.

The first apertures 202a and the second apertures 204a are provided to be displaceable with respect to each other between a first position and a second position. At the first position, all apertures are matched in position and aligned with corresponding apertures as shown in FIG. 12. At the second position, all apertures are displaced from corresponding apertures by sliding the second plate member 204.

The first plate member 202 has one side facing the back of the parent that is provided with a cushion member 203. Cushion member 203 has third apertures 203a corresponding to the first apertures 202a of the first plate member 202. The second plate member 204 has one side facing the child that is provided with a cushion member 209 having fourth apertures 209a corresponding to the second apertures 204a of the second plate member 204.

On respective bottom ends of the first plate member 202, the second plate member 204, cushion member 203 and cushion member 209, opening regions 202b, 204b, 203b and 209b are provided. Opening regions 202b, 204b, 203b and 209b are used for placing such an elastic member 208 as rubber coupling the first plate member 202, the second plate member 204, cushion member 203 and cushion member 209 to each other. Accordingly, the second plate member 204 is sidable with respect to the first plate member 202. In the normal state, all of the apertures are matched in position and aligned, i.e., at the first position.

The first plate member 202, the second plate member 204 and cushion members 203 and 209 are covered with a breathing covering member 207 like a mesh for example. On the top end of the second plate member 204, a catch 205 like a hook for example is provided. Above catch 205, covering member 207 has a catch 206 like a hook for example for detachably holding catch 205. The second plate member 204 is slid upward to allow catch 205 to be caught by catch 206 so as to select the second position at which all apertures are displaced from corresponding apertures.

In summer or on a hot and humid day, the second plate members 104 and 204 are held at the first positions shown respectively in FIGS. 11 and 12. In this state, first apertures 102a and 202a of the first plate members 102 and 202 are aligned with second apertures 104a and 204a of the second plate members 104 and 204 to pass wind or current of air therethrough and accordingly provide the coolness to the backs respectively of the child and parent.

In winter or on a cold and windy day, the second plate members 104 and 204 are slid upward and held as they are. In this state, first apertures 102a and 202a of the first plate members 102 and 202 are displaced from second apertures 104a and 204a of the second plate members 104 and 204 and thus these apertures are closed to prevent wind or current of air from entering through the apertures. Accordingly, good thermal insulation is maintained or dissipation of heat is prevented.

The second embodiment has been described in terms of a preferred form thereof which is by way of illustration only. Various modifications and variations are possible for the second embodiment as those of the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A childcare instrument with a seat including a wall forming a child-receiving space,
    said wall including a core member positioned along at least one of a seat base, a back, or lateral sides of said seat,
    said core member including first and second plate members arranged to overlap each other,
    said first plate member having a first aperture piercing through said first plate member in a direction of thickness of said first plate member,
    said second plate member having a second aperture piercing through said second plate member in a direction of thickness of said second plate member, and being relatively displaceable between a first position to align said first and second apertures with each other and a second position to displace said first and second apertures from each other, and
    including a sheet placed along said seat base and said back of said seat and a bag attached behind said core member located along said back, wherein said core member is contained in said bag to be removable therefrom.

2. The childcare instrument according to claim 1, wherein said first and second plate members are placed along said seat base, said back or said lateral sides of said seat.

3. The childcare instrument according to claim 1, further including a hood above said seat, wherein a wall constituting said hood includes additional ones of said first and second plate members.

4. The childcare instrument according to claim 1, wherein said bag is a mesh bag.

5. A childcare instrument for supporting a child therein, comprising a wall that defines and bounds a child-receiving space in which the child may be received, wherein said wall includes a sheet positioned along at least a back of said seat, a bag attached outwardly behind said sheet, and a core member that is removably arranged in said bag and that comprises:
    a first wall plate having a first air vent opening that penetrates through said first wall plate; and
    a second wall plate having a second air vent opening that penetrates through said second wall plate;
    wherein said first and second wall plates are arranged parallel and overlapping one another, and are relatively slidably connected to one another so that at least one of said wall plates is slidably displaceable relative and parallel to another of said wall plates between a first position in which said first and second air vent openings are aligned sufficiently to allow air communication therethrough into said child-receiving space and a second position in which said first and second air vent openings are offset from one another to block said air communication therethrough.

6. The childcare instrument according to claim 5, wherein said wall is a support wall that is positioned and arranged to contact and support the child in said child-receiving space.

7. The childcare instrument according to claim 5, wherein said bag is a mesh bag.

* * * * *